United States Patent
Sathish

(10) Patent No.: US 8,621,563 B2
(45) Date of Patent: Dec. 31, 2013

(54) METHOD AND APPARATUS FOR PROVIDING RECOMMENDATION CHANNELS

(75) Inventor: Sailesh Kumar Sathish, Tampere (FI)

(73) Assignee: Nokia Corporation, Espoo (FI)

( * ) Notice: Subject to any disclaimer, the term of this patent is extended or adjusted under 35 U.S.C. 154(b) by 69 days.

(21) Appl. No.: 13/074,380

(22) Filed: Mar. 29, 2011

(65) Prior Publication Data
US 2012/0254970 A1   Oct. 4, 2012

(51) Int. Cl.
*H04L 9/32* (2006.01)
(52) U.S. Cl.
USPC .................................. 726/2; 726/3; 726/9
(58) Field of Classification Search
USPC ........... 726/1–9; 725/1, 25–30, 37–40, 52–57
See application file for complete search history.

(56) References Cited

U.S. PATENT DOCUMENTS

| | | | |
|---|---|---|---|
| 6,898,799 B1 * | 5/2005 | Jarman | 725/25 |
| 8,209,721 B2 * | 6/2012 | Trauth | 725/46 |
| 2008/0045236 A1 | 2/2008 | Nahon et al. | |
| 2009/0033633 A1 | 2/2009 | Newman et al. | |
| 2010/0042611 A1 | 2/2010 | Cruzada | |

FOREIGN PATENT DOCUMENTS

WO   WO 03/054654 A2   7/2003

OTHER PUBLICATIONS

Kumar et al., "Context enabled Multi-CBR based Recommendation Engine for E-commerce," IEEE International Conference on e-Business Engineering, 2005, 1-8.
Liu et al., "Using Contextual Information for Service Recommendation," IEEE, 2011, pp. 1-9.

* cited by examiner

*Primary Examiner* — Hosuk Song
(74) *Attorney, Agent, or Firm* — Ditthavong Mori & Steiner, P.C.

(57) ABSTRACT

An approach is presented for providing recommendation channels. A recommendation platform receives an input for creating at least one recommendation channel, the input specifying at least one category. Next, the recommendation platform determines one or more tokens based, at least in part, on the at least one category, wherein at least one of the one or more tokens represents context information. Then, the recommendation platform determines to create the at least one recommendation channel based, at least in part, on the one or more tokens.

20 Claims, 8 Drawing Sheets

METHOD AND APPARATUS FOR PROVIDING RECOMMENDATION CHANNELS

BACKGROUND

Service providers and device manufacturers (e.g., wireless, cellular, etc.) are continually challenged to deliver value and convenience to consumers by, for example, providing compelling network services. One area of interest has been the use of recommendation systems to provide users with suggestions or recommendations for content (e.g., websites, documents, items, songs, video, etc.). For example, a search engine may provide content to users by allowing the user to search for content based on, for instance, a selected category. As such, the user is only presented with information relevant to the selected category, limiting the amount of information that a user has to review. However, because the selected category may be overbroad, the amount of information (e.g., links, content summaries, etc.) offered to the user may still be overwhelming. Moreover, much of the recommended content provided by such a category-based system may not be of interest to the user.

Some Example Embodiments

Therefore, there is a need for an approach for providing recommendation channels.

According to one embodiment, a method comprises receiving an input for creating at least one recommendation channel, the input specifying at least one category. The method also comprises determining one or more tokens based, at least in part, on the at least one category, wherein at least one of the one or more tokens represents context information. The method further comprises determining to create the at least one recommendation channel based, at least in part, on the one or more tokens.

According to another embodiment, an apparatus comprises at least one processor, and at least one memory including computer program code, the at least one memory and the computer program code configured to, with the at least one processor, cause, at least in part, the apparatus to receive an input for creating at least one recommendation channel, the input specifying at least one category. The apparatus is also caused to determine one or more tokens based, at least in part, on the at least one category, wherein at least one of the one or more tokens represents context information. The apparatus is further caused to determine to create the at least one recommendation channel based, at least in part, on the one or more tokens.

According to another embodiment, a computer-readable storage medium carries one or more sequences of one or more instructions which, when executed by one or more processors, cause, at least in part, an apparatus to receive an input for creating at least one recommendation channel, the input specifying at least one category. The apparatus is also caused to determine one or more tokens based, at least in part, on the at least one category, wherein at least one of the one or more tokens represents context information. The apparatus is further caused to determine to create the at least one recommendation channel based, at least in part, on the one or more tokens.

According to another embodiment, an apparatus comprises means for receiving an input for creating at least one recommendation channel, the input specifying at least one category. The apparatus also comprises means for determining one or more tokens based, at least in part, on the at least one category, wherein at least one of the one or more tokens represents context information. The apparatus further comprises means for determining to create the at least one recommendation channel based, at least in part, on the one or more tokens.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of claims 1-10.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing recommendation channels are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
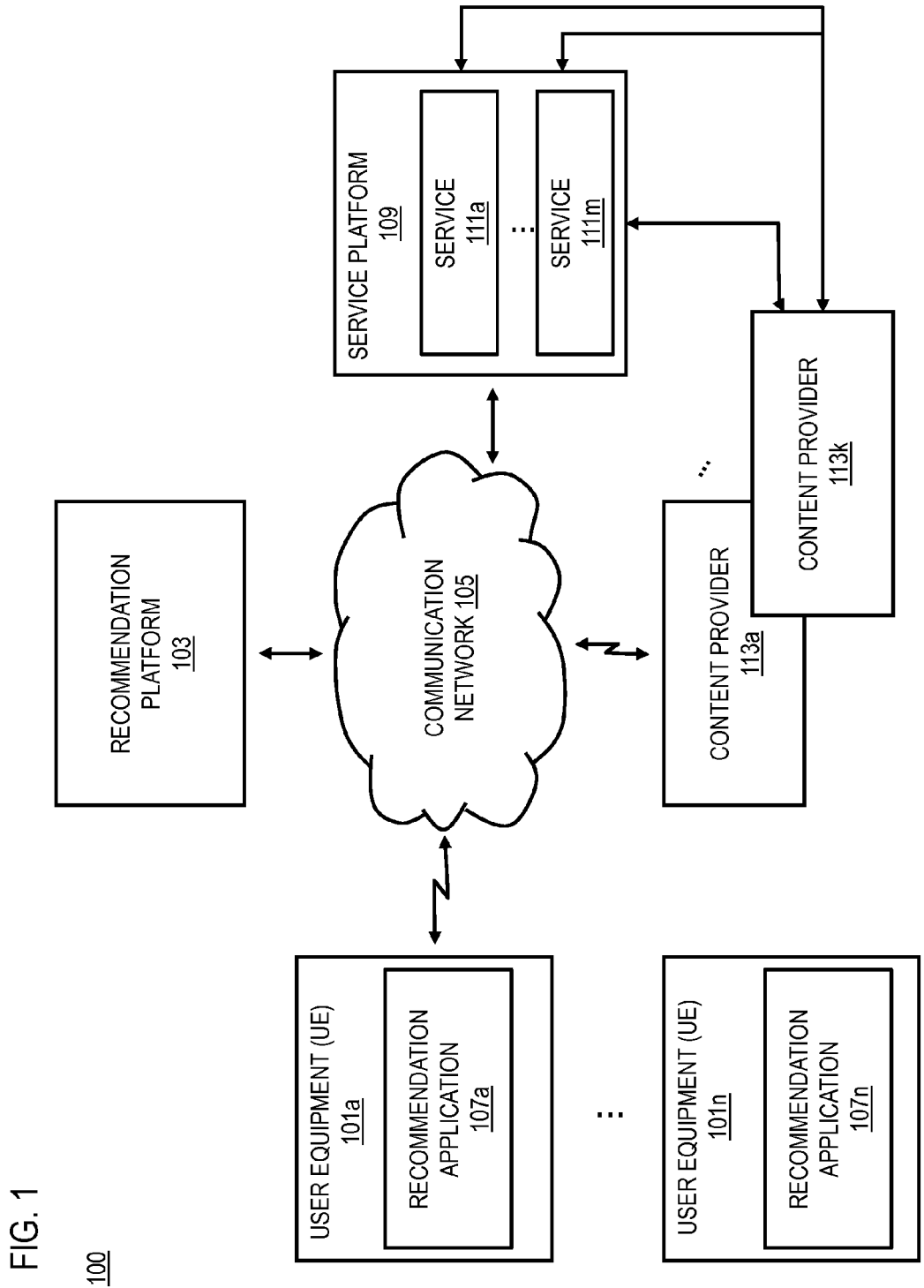
FIG. 1 is a diagram of a system capable of providing recommendation channels, according to one embodiment.

FIG. 1 is a diagram of a system capable of providing recommendation channels according to one embodiment, where the recommendation channels are token-based. As mentioned, current information systems provide users with content (e.g., websites, documents, items, songs, video, etc.), based, at least in part, on a user's search query along with a user-selected category. Such systems may limit content offering to content relevant to the search query and the selected category, reducing the amount of information (e.g., links, content summaries, etc.) that the user has to review, for instance, to find content of most interest to the user. However, because the category may not be narrowly-tailored, the user may still be presented with an overbearing amount of information containing many recommendations not of interest to the user. For example, a user in City X looking for breakfast may search for restaurant options early in the morning using the search query "breakfast" under the category "restaurants" only to be frustrated by links recommending restaurants in other cities and/or restaurants that have not yet opened.

To address this problem, a system 100 of FIG. 1 introduces the capability to enable content recommendations via recommendation channels. Specifically, the system 100 may create recommendation channels using tokens associated with a particular category, wherein some of the tokens represent context information (e.g., time, location, etc.). By way of example, the system 100 may receive an input to create a recommendation channel, wherein the input specifies a particular category. Based on the category, the recommendation channel may be created using tokens associated with the category, including tokens representing context information. The tokens may, for instance, be keywords, representative media items (e.g., images, sounds, etc.), etc., that describe, represent, or otherwise signify the things, ideas, concepts, categories, etc., of potential interest.

In one scenario, when the system 100 is first activated (e.g., the recommendation application 107 is installed or activated at the UE 101), the system 100 receives an input specifying at least one category that can be used to create at least one recommendation channel. By way of example, incoming information format includes, for instance: (1) text messages, instant messages, email message, and the like delivered to the UE 101 over the communication network 105; (2) pictures/documents delivered to the device (e.g., via short range wireless communications such as Bluetooth, WiFi, etc.); and the like. Once the incoming information specifies a category, tokens may be activated or used for classification in the UE 101. In some embodiments, the token-based classification may be further grouped or determined according to context information (e.g., location information such as country, region, etc.) where each different category of context information can have a separate set of tokens. In addition or alternatively, the system 100 may perform a semantic analysis of the device information to discover the set of tokens.

As shown in FIG. 1, the system 100 comprises a user equipment (UE) 101 or multiple UEs 101a-101n (or UEs 101) having connectivity to a recommendation platform 103 via a communication network 105. The UEs 101 and the recommendation platform 103 also have connectivity to a service platform 109 hosting one or more respective services/applications 111a-111m (also collectively referred to as services/applications 111), and content providers 113a-113k (also collectively referred to as content providers 113). In one embodiment, the recommendation application 107a-107n, platform 109, the services/applications 111a-111m, or a combination thereof have access to, provide, deliver, etc. one or more items associated with the content providers 113a-113k. In other words, content and/or items are delivered from the content providers 113a-113k to the applications 107a-107n or the UEs 101 through the service platform 109 and/or the services/applications 111a-111m. The service platform 109, services/applications 111, and/or the content providers 113 may deliver their functionality to the UE 101 based on the determined tokens associated with the UE 101 and/or a user of the UE 101. In addition, the service platform 109, services/applications 111, and/or the content providers 113 may also provide external modules and/or plug-ins (e.g., advertisement plug-ins, location-based services, etc.) to extend the functionality of the UE 101 based on the determined tokens.

In some cases, a service/application 111 and/or content provider 113 may request that the recommendation platform 103 generate one or more recommendations with respect to content, items, functions, services, etc. to deliver to the UE 101. After receiving the request for recommendation information, the recommendation platform 103 may then retrieve the tokens, contexts, location, etc. from one or more profiles associated with the requesting service/application 111 and/or content provider 113. The recommendation platform 103 may further generate the content recommendation based at least in part on the retrieved token sets, token frequency distribution, etc.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof. A UE 101 may include or have access to an analyzer (e.g., recommendation applications 107a-107n), which may consist of client programs, services, or the like that may utilize a system to provide token-based categorization of device information to users.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the recommendation platform 103, and the recommendation application 107 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, recommendation platform 103 may generate recommendation information (e.g., suggestions and/or recommendations) for use by one or more applications, services, processes, etc., executing at the UE 101 based, at least in part, on the tokens associated with categories. For example, recommendation platform 103 can determine the tokens most associated with categories and the device information stored at the UE 101. The tokens then represent the tokens of most interest to the user (as the user has selected a category and the tokens representing those categories are used) with respect to the applications, category selected, and user context. The most relevant tokens can then be used to generate the recommendation information. In some embodiments, the applications and/or related tokens may be associated with external modules and/or plug-ins that provide additional functionality based on the associated and/or most relevant tokens. For example, the external modules and/or plug-ins may provide recommended or related advertisements, marketing information, promotions, etc. based on the associated tokens.

In another embodiment, the recommendation platform 103 may process and/or facilitate a processing of the one or more tokens to determine one or more other tokens. The recommendation platform 103 may then associate the one or more other tokens to the at least one recommendation channel. By way of example, the processing may include searching for patterns within content to extract additional semantics between tokens. By then applying the additional semantics as rules to process tokens, the platform may generate additional tokens or more relevant tokens to characterize the channel.

In another instance, processing of the one or more tokens may comprise application of one or more language models. In one use case, language models may have additional semantics that dictate rules at various levels of specificity. In this way, channel semantics may be updated and more closely linked to content.

Once at least one recommendation channel is formed, the recommendation platform 103 may determine one or more data structures based on the one or more tokens, wherein the one or more data structures store content information relevant to the at least one recommendation channel. In one scenario, each content has a data structure that indexes the content into values extracted for matching channel tokens.

In one embodiment, the recommendation platform 103 may process and/or facilitate a processing of the content information to populate the one or more data structures based on a comparison of the content information against the one or more tokens. The rules regarding data types and semantics may be specified in an ontology or logic directly built into implementation. The rules may also be pre-loaded to the system, added or modified by an administrator during run time, or uploaded by the user. Additionally, each channel may contain several rules, and content may belong in multiple channels.

In a further embodiment, the one or more data structures may be populated based on one or more heuristics. For example, the data structure contains rules defining tokens that correspond to what needs to be extracted from the content. For instance, a rule may define a token for a value that needs to be extracted from the content, as well as what to look for in the content that would signal a value matching the token. This means a rule for the token, "Open time," may call upon recommendation platform 103 to look for, "open", "open from", "opening", or "opening hours" in the content to find values that would match "open time." Additionally, a rule may include what type of data to look for that would be an appropriate value for the token. For example, token, "open time," might have the type where the recommendation platform 103 tries to find a text string within a range that may be converted to a time in the vicinity of a token. Furthermore, the rule may specify whether the value matching the token is single or multiple. A single value type may entail that once one value matching the token is found, no further matching value must be found. "Opening time" may be one such value. "Restaurant Type," however, may include multiple values since multiple descriptors might express "Restaurant Type."

In another embodiment, the recommendation platform 103 may parse the content information to determine relevance information with respect to the one or more tokens, wherein the one or more data structures is populated based, at least in part, on the relevance information. In one scenario, for instance, values that are determined to have relevance information above a certain threshold are stored to the data structure, while values with relevance below information below the threshold are not stored.

Using relevance information may mean the recommendation platform 103 generates a frequency distribution of the one or more tokens with respect to the content information, wherein the relevance information is based on the frequency distribution. As an example, the relevance information may be a frequency distribution of language content tags. In such a scenario, all words with a high frequency above a set threshold are removed, as they may be common words that do not provide relevant information. Then, only the remaining words are processed for matching the tokens.

The recommendation platform 103 may also update the one or more tokens based on the frequency distribution. By way of an example, the recommendation platform may compare a general frequency distribution of certain tokens based for example on a language model against the frequency distribution of tokens within the given content. Then, frequency distributions that deviate from the standard distribution may imply tokens that should be included for future analysis regarding their connection with the content. The deviations from for example a standard language model distribution indicates a high relevance of those tokens that deviate for the content that is analyzed.

In another embodiment, the recommendation platform 103 may receive a request, from a user, for a recommendation. For example, a user may request a recommendation for a restaurant. The recommendation platform 103 may then determine other context information associated with the user, a device associated with the user, etc. In this case, the recommendation platform 103 may determine the time and place of the user and additional relevant context information associated with Restaurants. The recommendation platform 103 may further process and/or facilitate a processing of the request, the other context information, the at least one recommendation channel, the one or more tokens, etc., to generate the recommendation. For this instance, the recommendation platform may engage in multiple layers of analysis to yield to the user recommendations relevant to the user's time, place, and interest.

Figure 2:
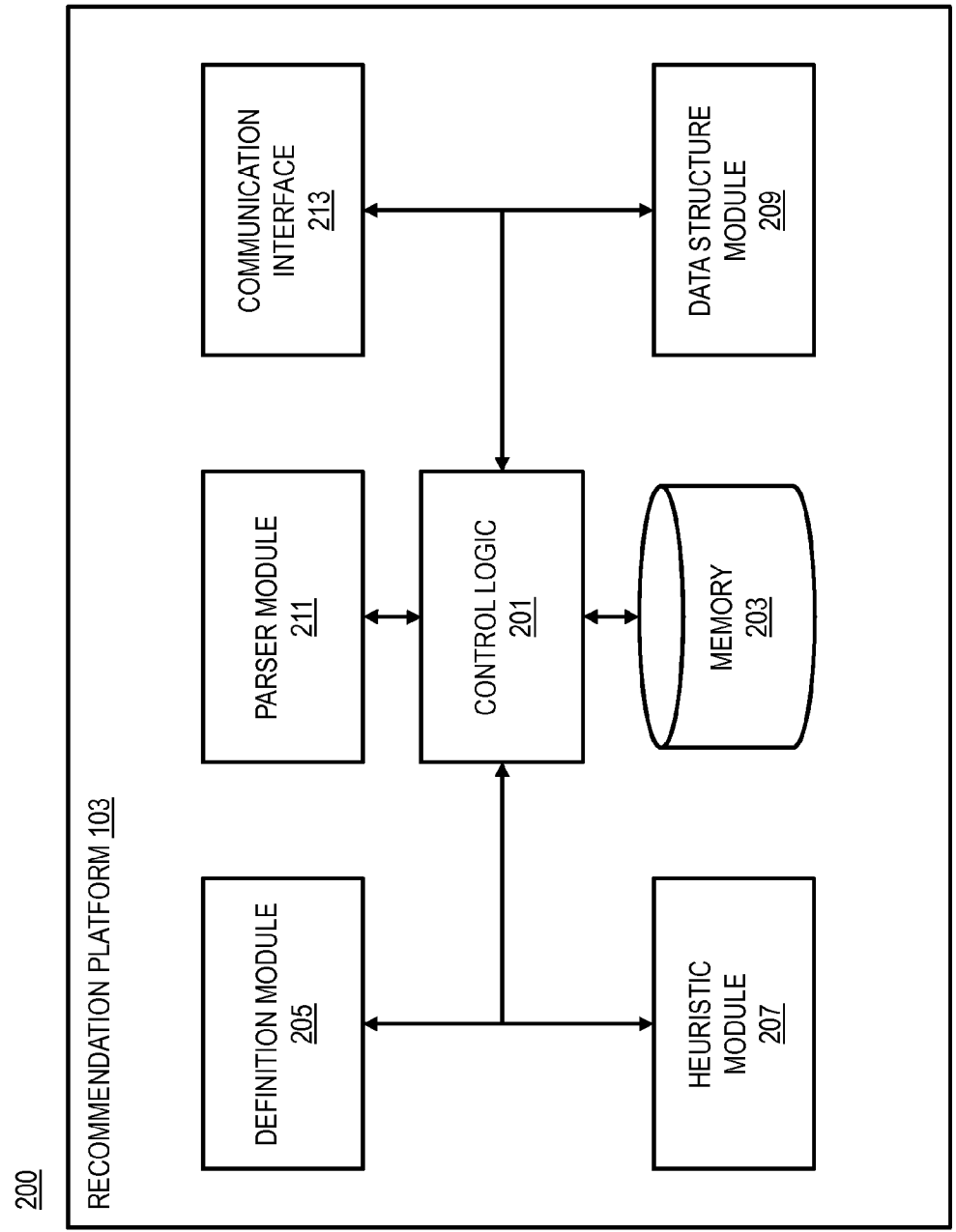
FIG. 2 is a diagram of the components of a recommendation platform, according to one embodiment.

FIG. 2 is a diagram of the components of a recommendation platform, according to one embodiment. By way of example, the recommendation platform 103 includes one or more components for providing recommendation channels. It is contemplated that the functions of these components may be combined in one or more components or performed by other components of equivalent functionality. In this embodiment, the recommendation platform includes a control logic 201 which executes at least one algorithm for performing and/or coordinating the functions of the recommendation platform 103.

In one embodiment, the recommendation platform 103 is comprised of the control logic 201, which works in conjunction with the memory 203, definition module 205, heuristic module 207, data structure module 209, parser module 211, and communication interface 213. The definition module 205 forms the initial definition for each channel using tokens that characterize the channel. For example, a Restaurant channel might have tokens: restaurant, breakfast, dinner, menu, a la carte, dining, lunch, etc. Content matching the tokens may be a restaurant website that qualifies as an entry in the Restaurant channel.

In a further embodiment, the definition module 205 may include a post-process that further bolsters the existing token definition in the definition module 205 for the category. Such a post-process may be comprised of processing and/or facilitating processing of existing tokens to determine more tokens in association with a recommendation channel. Identifying more tokens related to the recommendation channel may further develop the channel definition.

In one example of a post-process, the processing and/or facilitating processing may further comprise using a language model extract additional tokens found in the vicinity of a lattice for a token in the model. For each token, N number of tokens may be extracted and added to the definition module 205 definition for the channel.

The heuristic module 207 applies the collected tokens to content. For example, the heuristic module 207 may host a set of key, values, and value types to be used by control logic 201. Each channel may then have an entry in heuristic module 207, which defines a set of rules to be applied to content from the content provider 113. The rules may set out tokens for values that are to be extracted from content as it is analyzed. There may be several rules associated with each channel. In one embodiment, the rules can be pre-loaded to the system where an administrator can add or modify them during run time. In another embodiment, users can upload rules as well.

Tokens making up rules in the heuristic module 207 collectively form the data structure module 209, a data set indexing content information. The data structure module 209 stores, at least in part, content information relevant to the recommendation channel. Each content may have an associated data structure module 209 that classifies characteristics of the content into values matching tokens.

Especially for user-created channels, the control logic 201 creates the associated data structure module 209 for content information relevant to the channels. Some content may belong to multiple channels, so the content may have multiple entries within their data structure module 209, one for each channel they belong to. In future embodiments, certain fields in the data structure 209 may merge to form new channels, combining channel parameters.

Once the data structure module 209 is created, the parser module 211 processes and/or facilitates processing of the content to populate the data structure module 209 based, at least in part, on a comparison of the content information against the one or more tokens. In one embodiment, the parser module 211 populates the data structure module 209 based, at least in part, on heuristics. Heuristics may include rules regarding the value that needs to be extracted from the content to match the tokens. For example, the rules may define the value by specifying what to look for in the content that might indicate a relevant value, value type, and/or how often values matching the token are expected to occur in the content. In one scenario, a rule searching for content regarding the opening time of a restaurant might include the tokens "open", "open from", "opening", or "opening times" to indicate values in the content that may match the tokens. The rule may set value type as a text string with a range that can be converted to a time within the vicinity of one of these tokens, and the value may be set to "single" (versus "multiple"), since only one value in the content is needed to match the opening time. A rule for restaurant type, however, may be set at "multiple" occurrences in the content because many descriptors may be relevant for restaurant type. For example, a restaurant might serve Chinese, Japanese, and Vietnamese food, all of which may match the restaurant type token.

The parser module 211 populates the data structure module 209 based, at least in part, on relevance information with respect to the tokens. In such a case, relevance information may comprise a frequency distribution of tokens with respect to content information. By extension, the parser module 211 may update tokens based, at least in part, on the frequency distribution. Such post-processing enhances tightness between channel semantics and content.

In one embodiment of post-processing involving relevance information, the control logic 201 may calculate a frequency distribution of content tags while finding significant tokens within content using a language model. Here, all words with a frequency above a set threshold may be removed, as they are likely common words that do not provide substantive information to extract. In another embodiment, even the words with the smallest frequency may be removed as they may be found not to be useful enough to be generalized such as the name of a person. In one such instance, whole content may be unfiltered prior to passing through tags for analysis. In another scenario, the control logic 201 may compare the general frequency distribution of certain tokens against the frequency of tokens within the content. Updating channel tokens against content tokens ensures that content stored in the data structure 209 indeed matches the channel.

The control logic 201 may also utilize the communication interface 213 to communicate with other components of the recommendation platform 103, the UEs 101, the service platform 109, the content providers 113, and other components of the system 100. The communication interface 213 may include multiple means of communication. For example, the communication interface 213 may be able to communicate over SMS, internet protocol, instant messaging, voice sessions (e.g., via a phone network), or other types of communication.

Figure 3:
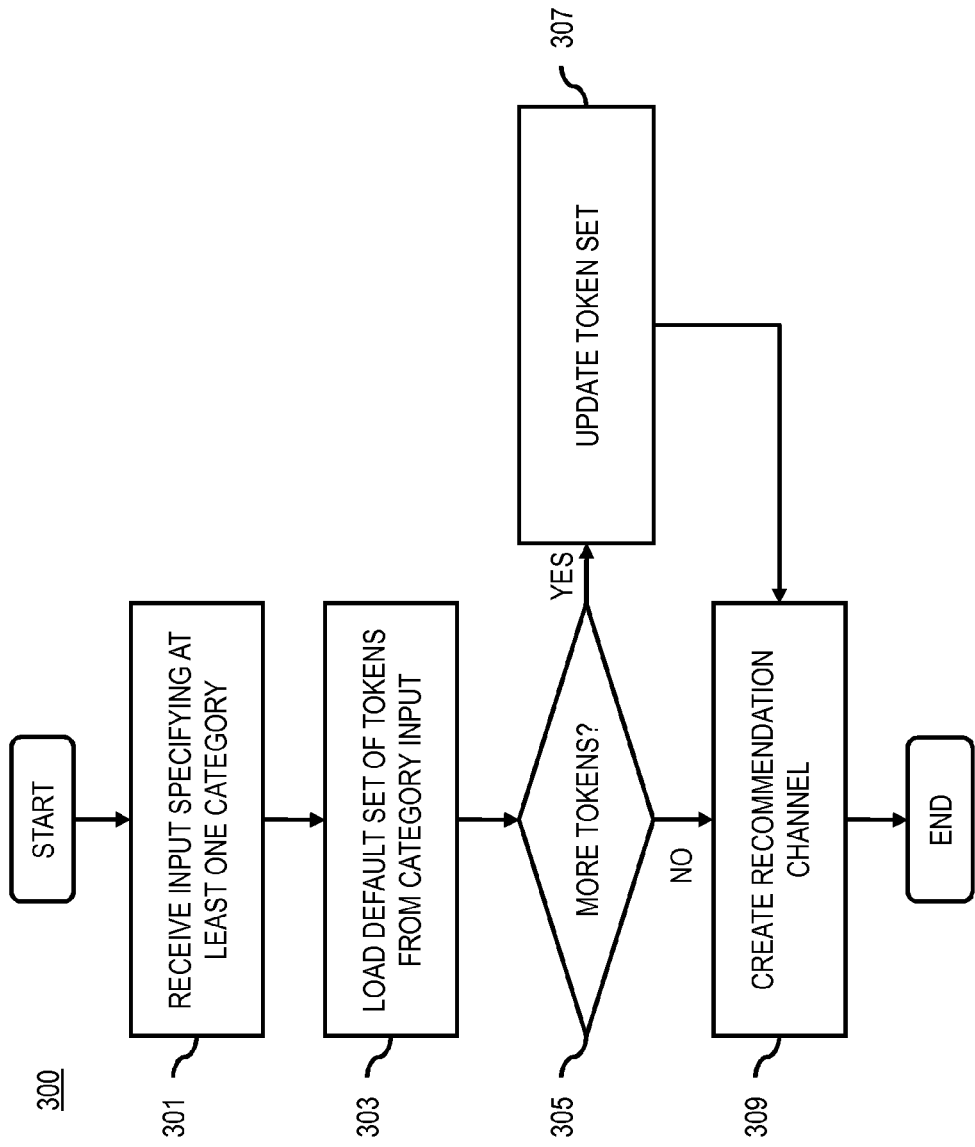
FIG. 3 is a flowchart of a process for providing recommendation channels, according to one embodiment.
Figure 6:
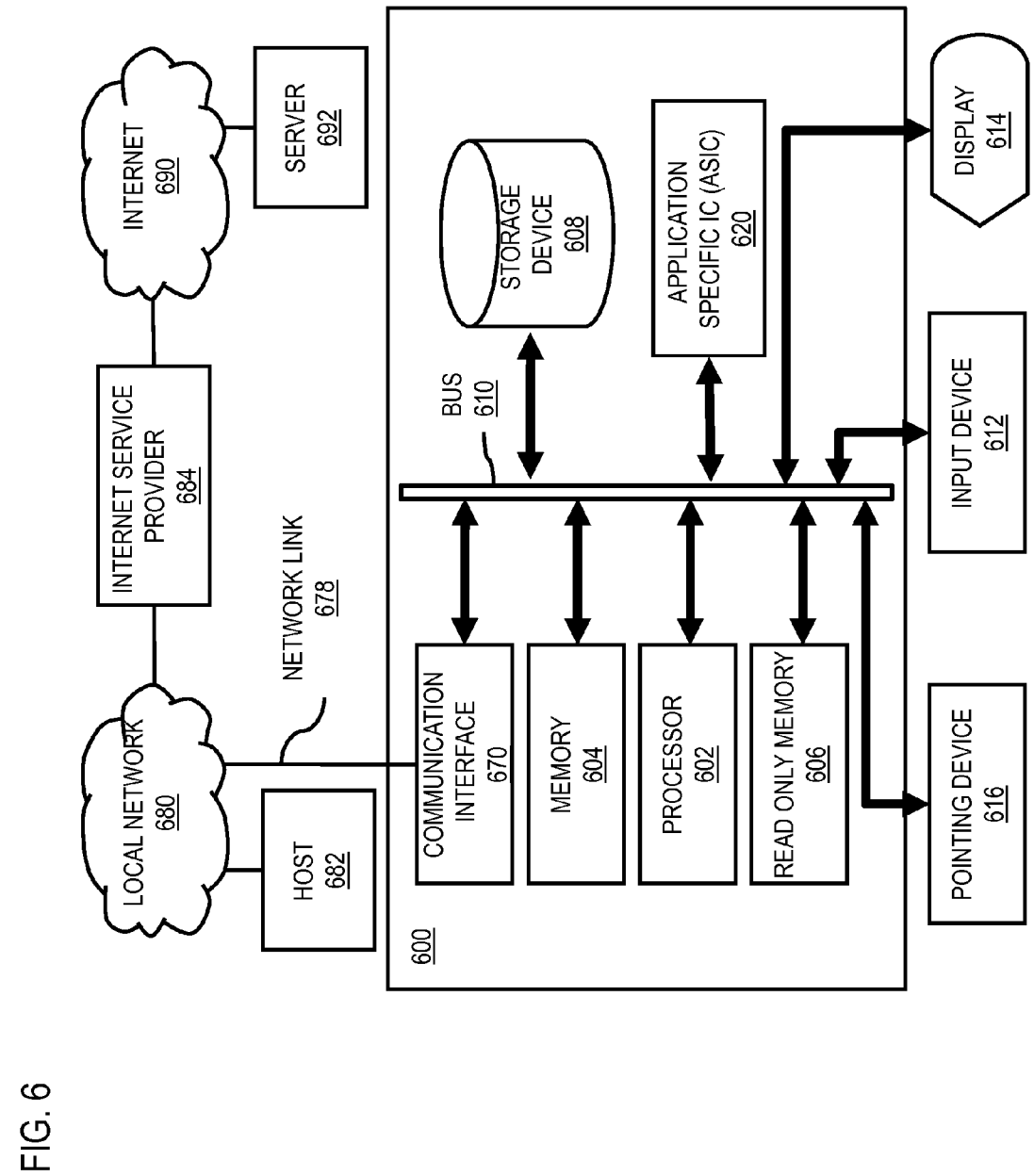
FIG. 6 is a diagram of hardware that can be used to implement an embodiment of the invention.

FIG. 3 is a flowchart of a process for providing recommendation channels, according to one embodiment. In one embodiment, the control logic 201 and/or other components of recommendation platform 107 performs the process 300 and is implemented in, for instance, a chip set including a processor and a memory as shown in FIG. 6. As such, the control logic 201 can provide means for accomplishing various parts of the process 300 as well as means for accomplishing other processes in conjunction with other components of the recommendation platform 103.

In step 301, the control logic 201 may receive input for creating a recommendation channel, where the input specifies at least one category. Possible pre-defined categories include Restaurant, Event, Tourist, Education, Sports, and/or Wildcard. Additional categories may be added manually, by the user, or by a heuristic. Alternately or in addition, different categories may be activated in response to context.

Once the category is specified, the control logic 201, may then determine one or more tokens based on the at least one category specified from the definition module 205, as in step 303. At least one of the tokens represents context information, while other tokens represent content associated with the category and defining the category. The control logic 201 may also process and/or facilitate processing of the one or more extracted tokens to determine more tokens associated with the extracted tokens (step 305). One way of processing may comprise of applying a language model. If more tokens are found in association with the extracted and default tokens, the token set is updated before the recommendation channel is created (step 307). Otherwise, the recommendation platform 103 determines the recommendation channel from the tokens associated with the category (step 309). The recommendation may then be made an entry in the heuristic module 207.

In some embodiments, the recommendation platform 107 may also suggest that some tokens or category of tokens be removed if they are not frequently used with respect to the device information according to the parser module 211 processing. For example, if taking a frequency distribution of content tags within a set shows some tokens to deviate from a standard distribution, the tokens may be discarded or further analyzed. It is also contemplated that the recommendation platform 107 may make any other recommendations regarding modifications to the determined token set. The control logic 201 may update the heuristic module 207 based on the recommended modifications. For example, tokens in the heuristic module 207 may be added or abandoned based on the parser module 211 processing.

Figure 4:
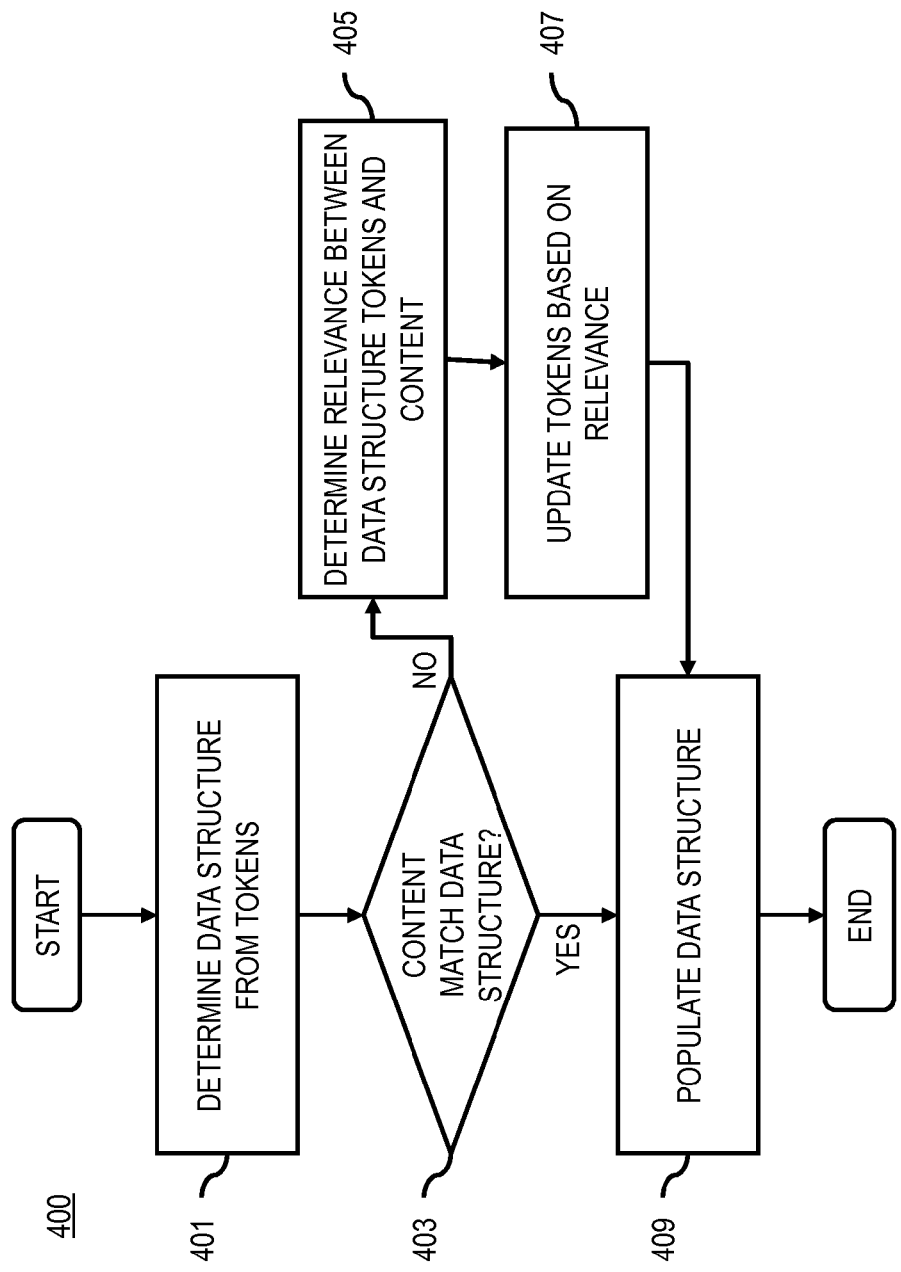
FIG. 4 is a flowchart of a process for populating data structures, according to one embodiment.

FIG. 4 is a flowchart of a process for populating a data structure, according to one embodiment. In one embodiment, the control logic 201 and/or other components of recommendation platform 103 performs the process 400 and is implemented in, for instance, a chip set including a processor and a memory as shown in FIG. 6. As such, the control logic 201 can provide means for accomplishing various parts of the process 400 as well as means for accomplishing other processes in conjunction with other components of recommendation platform 103.

In step 401, the parser module 211 may determine tokens that are representative of a particular category and then determine or otherwise define one or more data structures 209 based, at least in part, on the tokens. In one embodiment, the tokens and thereof the corresponding data structures 209 would include data elements and or fields that be descriptive of items belonging in a particular category or recommendation channel. For example, for a recommendation channel designated for a restaurant category, the fields of the data structures 209 may be related to the type of cuisine, operating hours, location, cost, capacity, etc.

In step 403, the parser module 211 compares tokens in content to tokens in the recommendation channel. In one embodiment, the parser module 211 then directly populates the data structure module 209 with content information matching tokens, possibly using heuristics (step 403). For example, step 403 may include heuristics specifying tokens to seek out in content, value type that matches the tokens, and how many times the value may occur in the content.

In a further embodiment, relevance between the recommendation channel tokens and content tokens is assessed (step 405). The relevance information may be comprised of a frequency distribution of the content tokens. The parser module 211 may then use the frequency distribution to update the channel tokens (step 407). From this, control logic 201 constructs a more relevant recommendation channel token data structure before proceeding to step 409 of storing content matching tokens in the data structure module 209.

Figure 5:
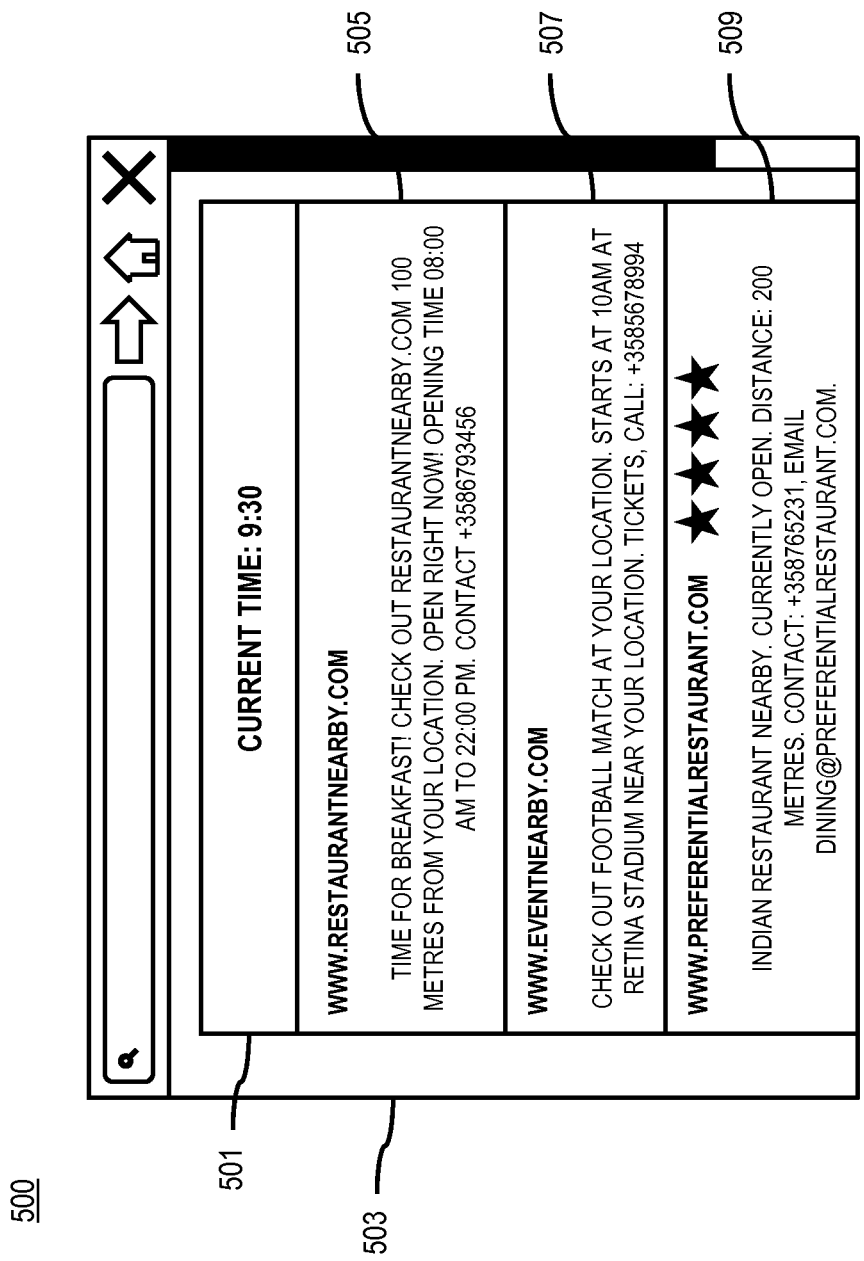
FIG. 5 is a diagram of a user interface utilized in the processes of FIGS. 3 and 4, according to one embodiment.

FIG. 5 is a diagram of a user interface utilized in the processes of FIGS. 3-4, according to various embodiments. The user interface 500 illustrates an example of the recommendation channel display which depicts the leisure options available to the user with respect to the time and location of the user. The time section 501 shows the time at which the user is looking for recommendations. In this example, the user is looking for recommendations at 9:30 AM. As a result, the recommendations section 503 lists recommendation channels containing recommendations relevant to the user's 9:30 AM time and location. For example, the Restaurant channel 505 recommends a restaurant within 100 meters from the user's location that is open for service, called Restaurant Nearby. The time and location of the user may be considered context information, and the recommendations per channel correspond directly to the context. The Event channel 507 recommends a football match in the vicinity of the user that starts at 10 AM. In this instance, the football match may be recommended based on token assessment that people in the vicinity of Retina Stadium are commonly looking to attend football matches. The match displayed is the LOAM match, closest to the user's time of 9:30 AM, since the user may still get to the stadium to catch the start of the game. Further, the Wildcard channel 509 displays a restaurant currently available to the user that may be recommended on the basis of availability to the user in addition to high relevancy to other users in the area. In this example, the quality is shown using a star-rating system from pre-loaded data or data collected via the device. Therefore, as shown in this example, both the recommendation model and the context-based tokens may be used to generate the recommendations.

The processes described herein for providing recommendation channels may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide recommendation channels as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing recommendation channels.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to providing recommendation channels. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for providing recommendation channels. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing recommendation channels, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for providing recommendation channels to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
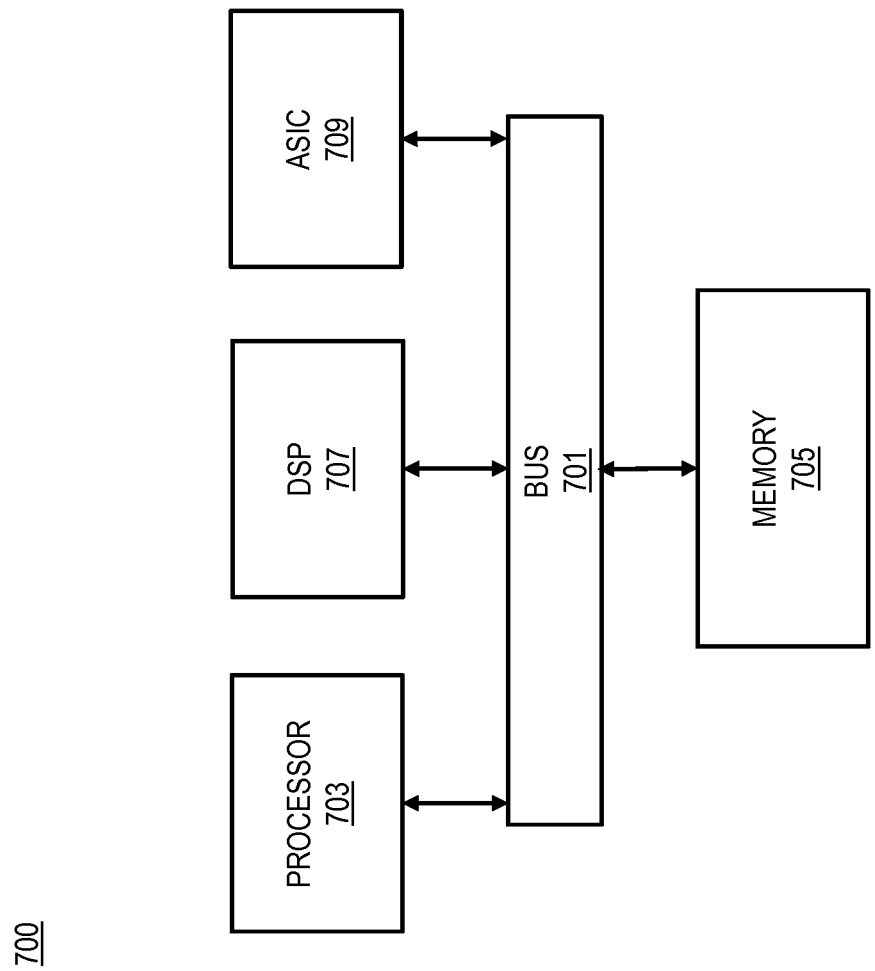
FIG. 7 is a diagram of a chip set that can be used to implement an embodiment of the invention.

FIG. 7 illustrates a chip set or chip 700 upon which an embodiment of the invention may be implemented. Chip set 700 is programmed to provide recommendation channels described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of providing recommendation channels.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide recommendation channels. The memory 705 also stores the data associated with or generated by the execution of the inventive steps.

Figure 8:
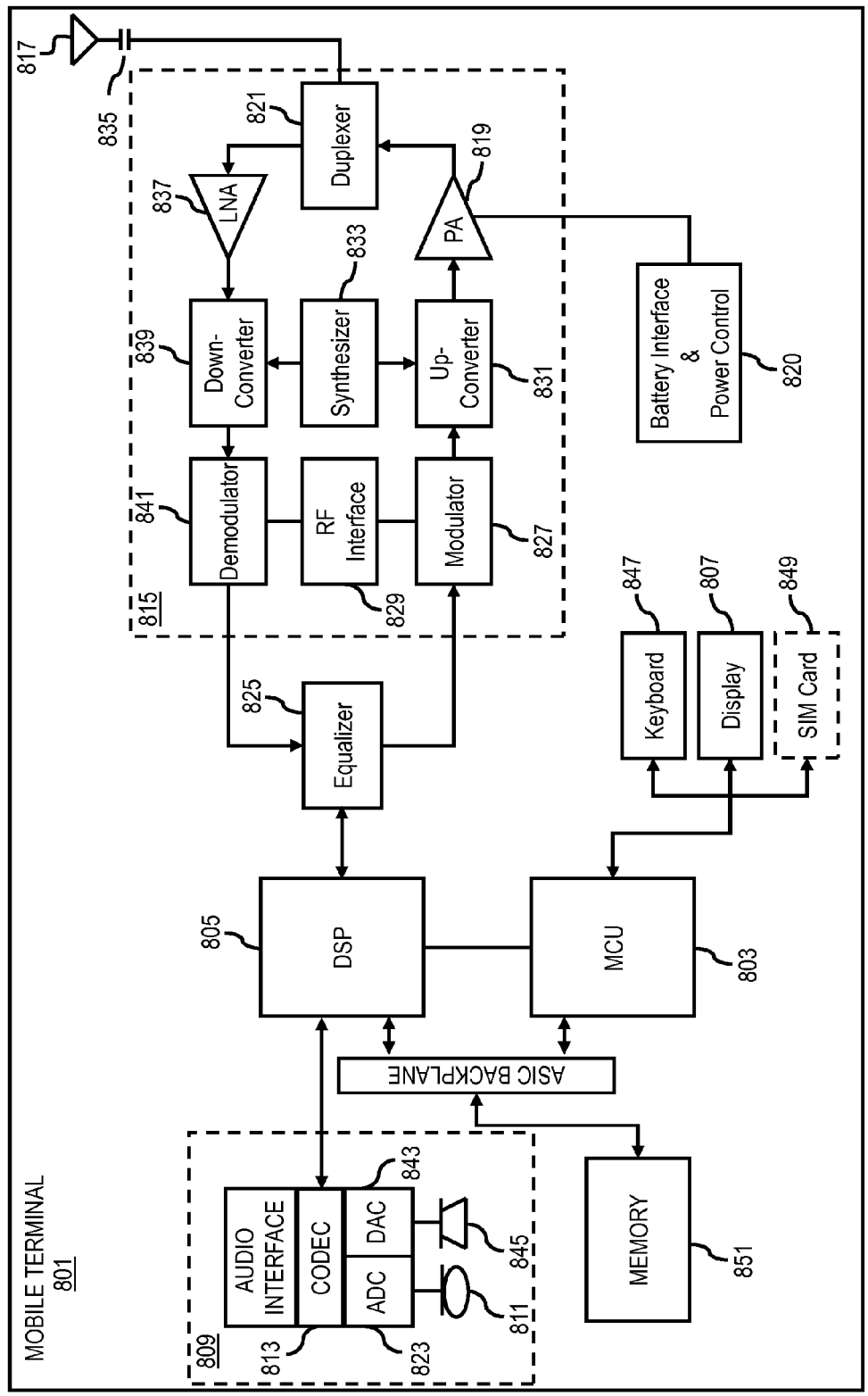
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of providing recommendation channels. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing recommendation channels. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide recommendation channels. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    an input for creating at least one recommendation channel, the input specifying at least one category;
    at least one determination, by at least one processor, of one or more tokens based, at least in part, on the at least one category, wherein at least one of the one or more tokens represents context information; and
    at least one determination to create the at least one recommendation channel based, at least in part, on the one or more tokens.

2. A method of claim 1, wherein the (1) data and/or (2) information and/or (3) at least one signal are further based, at least in part, on the following:
    a processing of the one or more tokens to determine one or more other tokens; and
    at least one determination to associate the one or more other tokens to the at least one recommendation channel.

3. A method of claim 2, wherein the processing and/or facilitating of a processing of the one or more tokens comprises, at least in part, application of one or more language models.

4. A method of claim 1, wherein the (1) data and/or (2) information and/or (3) at least one signal are further based, at least in part, on the following:
at least one determination of one or more data structures based, at least in part, on the one or more tokens,
wherein the one or more data structures store, at least in part, content information relevant to the at least one recommendation channel.

5. A method of claim 4, wherein the (1) data and/or (2) information and/or (3) at least one signal are further based, at least in part, on the following:
a processing of the content information to populate the at least one or more data structures based, at least in part, on a comparison of the content information against the one or more tokens.

6. A method of claim 5, wherein the populating of the one or more data structures is based, at least in part, on one or more heuristics.

7. A method of claim 5, wherein the (1) data and/or (2) information and/or (3) at least one signal are further based, at least in part, on the following:
a parsing of the content information to determine relevance information with respect to the one or more tokens,
wherein the populating of the one or more data structures is based, at least in part, on the relevance information.

8. A method of claim 7, wherein the (1) data and/or (2) information and/or (3) at least one signal are further based, at least in part, on the following:
at least one determination to generate a frequency distribution of the one or more tokens with respect to the content information,
wherein the relevance information is based, at least in part, on the frequency distribution.

9. A method of claim 8, wherein the (1) data and/or (2) information and/or (3) at least one signal are further based, at least in part, on the following:
at least one determination to update the one or more tokens based, at least in part, on the frequency distribution.

10. A method of claim 1, wherein the (1) data and/or (2) information and/or (3) at least one signal are further based, at least in part, on the following:
a request, from a user, for a recommendation;
at least one determination of other context information associated with the user, a device associated with the user, or a combination thereof; and
a processing of the request, the other context information, the at least one recommendation channel, the one or more tokens, or a combination thereof to generate the recommendation.

11. An apparatus comprising:
at least one processor; and
at least one memory including computer program code for one or more programs,
the at least one memory and the computer program code configured to, with the at least one processor, cause the apparatus to perform at least the following,
receive an input for creating at least one recommendation channel, the input specifying at least one category;
determine one or more tokens based, at least in part, on the at least one category, wherein at least one of the one or more tokens represents context information; and
determine to create the at least one recommendation channel based, at least in part, on the one or more tokens.

12. An apparatus of claim 11, wherein the apparatus is further caused to:
process and/or facilitate a processing of the one or more tokens to determine one or more other tokens; and
determine to associate the one or more other tokens to the at least one recommendation channel.

13. An apparatus of claim 12, wherein the processing of the one or more tokens comprises, at least in part, application of one or more language models.

14. An apparatus of claim 11, wherein the apparatus is further caused to:
determine one or more data structures based, at least in part, on the one or more tokens,
wherein the one or more data structures store, at least in part, content information relevant to the at least one recommendation channel.

15. An apparatus of claim 14, wherein the apparatus is further caused to:
process and/or facilitate a processing of the content information to populate the one or more data structures based, at least in part, on a comparison of the content information against the one or more tokens.

16. An apparatus of claim 15, wherein the populating of the one or more data structures is based, at least in part, on one or more heuristics.

17. An apparatus of claim 15, wherein the apparatus is further caused to:
cause, at least in part, parsing of the content information to determine relevance information with respect to the one or more tokens,
wherein the populating of the one or more data structures is based, at least in part, on the relevance information.

18. An apparatus of claim 17, wherein the apparatus is further caused to:
determine to generate a frequency distribution of the one or more tokens with respect to the content information,
wherein the relevance information is based, at least in part, on the frequency distribution.

19. An apparatus of claim 18, wherein the apparatus is further caused to:
determine to update the one or more tokens based, at least in part, on the frequency distribution.

20. An apparatus of claim 11, wherein the apparatus is further caused to:
receive a request, from a user, for a recommendation;
determine other context information associated with the user, a device associated with the user, or a combination thereof; and
process and/or facilitate a processing of the request, the other context information, the at least one recommendation channel, the one or more tokens, or a combination thereof to generate the recommendation.

* * * * *